US006749394B2

(12) United States Patent
Boatner

(10) Patent No.: US 6,749,394 B2
(45) Date of Patent: Jun. 15, 2004

(54) ROTATING DISPLAY APPARATUS

(76) Inventor: Bruce E. Boatner, 29507 Pebble Beach Dr., Murrieta, CA (US) 92563

(*) Notice: Subject to any disclaimer, the term of this patent is extended or adjusted under 35 U.S.C. 154(b) by 22 days.

(21) Appl. No.: 10/254,204

(22) Filed: Sep. 25, 2002

(65) Prior Publication Data

US 2004/0057830 A1 Mar. 25, 2004

(51) Int. Cl.[7] ................................................ F03D 7/06
(52) U.S. Cl. ........................ 415/4.2; 415/44; 415/140; 415/907
(58) Field of Search .............................. 416/119, 140; 415/4.1, 4.2, 4.4, 907; 40/479

(56) References Cited

U.S. PATENT DOCUMENTS

| | | |
|---|---|---|
| 226,357 A | 4/1880 | Saccone |
| 482,178 A | 9/1892 | Irish |
| 704,002 A | 7/1902 | Cribbs et al. |
| 1,232,895 A | 7/1917 | Cauthorn et al. |
| 1,511,965 A | 10/1924 | Hennigh |
| 1,534,634 A | 4/1925 | Correll |
| 1,534,635 A | 4/1925 | Correll |
| 2,030,769 A | 2/1936 | Slattengren |
| 2,038,467 A | 4/1936 | Zanoski |
| 2,076,784 A | 4/1937 | Knipp |
| 3,292,319 A | 12/1966 | McCarthy |
| 4,383,801 A | 5/1983 | Pryor |
| 4,408,956 A | 10/1983 | Price, Sr. |
| 4,415,312 A * | 11/1983 | Brenneman ................ 416/119 |
| 4,474,529 A | 10/1984 | Kinsey |
| D300,932 S | 5/1989 | Sikes |

* cited by examiner

Primary Examiner—Edward K. Look
Assistant Examiner—Dwayne J. White
(74) Attorney, Agent, or Firm—Loyal McKinley Hanson

(57) ABSTRACT

A rotating display apparatus includes a support structure, a rotor mounted rotatably on the support structure for rotation about a vertically disposed rotational axis, and at least two (preferably more) wind-reactive elements on the rotor on which a user may display promotional, political, or other information, including using the shape of the wind-reactive elements as the displayed information. The wind-reactive elements (airfoil or non-airfoil) cause the rotor to rotate about the rotational axis in response to wind passing the rotating display apparatus. Each is free to pivot between a respective one of first and second pairs of stop positions as the rotor rotates about the rotational axis in order to self-align according to wind direction and impart rotational movement to the rotor, moving through five phases per revolution as they orbit the rotational axis. One embodiment includes a constricting dampener mechanism that includes a spring arranged to constrict radially against a cylindrical portion of a pivot tube in order to inhibit pivotal movement of the tube (and thereby the associated wind-reactive element of which the tube is apart) when the wind-reactive element reaches a predetermined stop position. Another embodiment includes a moveable stop that restricts the free movement of the wind-reactive element in relation to the rotational speed of the rotor by means of centrifugal force. Yet another embodiment includes a dampener mechanism that disengages in heavy wind conditions.

28 Claims, 13 Drawing Sheets

ROTATING DISPLAY APPARATUS

BACKGROUND OF THE INVENTION

1. Technical Field

This invention relates generally to displays for decorative, advertising, and other promotional purposes, and more particularly to a rotating display apparatus powered by the wind for rotation about a vertical axis.

2. Description of Related Art

A rotating display apparatus (RDA) displays decorative objects, advertising, or other information as it rotates. An RDA that rotates about a vertical axis falls under the general description of a vertical axis wind turbine (VAWT), and a VAWT fits into one of two categories: either it has a fixed or rigid rotor structure, or it has movable members, reactive elements, airfoils, vanes, or the like. Many VAWTs in the first category, those with a fixed or rigid rotor structure, are derivations of the roof ventilator. Others of that category are adaptations of the basic "S" shape with typically two or three, but potentially up to six, sides or facets.

VAWTs in the second category, those with movable members and so forth, are either proactive or reactive. The airfoils or elements of a proactive VAWT are positioned in relationship to the wind via gears, cams, cables, pulleys, rods, or any number of other means in order to produce lift and turn the rotor. To accomplish this, the system must be aware of the wind direction, which is usually accomplished by means of a weathervane-type mechanism. One characteristic of this design type is the typically symmetrical angle of attack profile of the elements, usually configured for crosswind lift on the windward and leeward portions of the cycle, and faired on both the downwind and upwind legs. Pros and cons of this approach are described in U.S. patent application Ser. No. 10/178,209.

In a reactive VAWT, the airfoils or elements position themselves in response to fluid pressures experienced locally. These forces are produced by a combination of the true wind and the relative wind created by rotation. Some existing RDAs are this type. U.S. Pat. No. 482,178, for example, describes an advertising device that uses weights on a curved horizontal member, like a tightrope walker uses a balance bar. At each end of the horizontal member is a "package" (e.g., a medicine bottle) and support for a vane, hinged on its edge by a thin vertical support, which allows the down-wind vane to swing outward and catch the airflow, and the upwind vane to swing back to reduce friction. The patent illustrates the large supporting base of the unit echoing the "package." This is a simple mechanism, but it is probably as effective as some more complicated versions. This device appears to be intended to support specific products as the "packages" and base structure would be uniquely shaped in manufacturing. No accommodation for a generic version capable of supporting a range of "packages" is suggested.

U.S. Pat. No. 704,002 describes a wind actuated advertising device that is a bit more complicated, but basically a version of the advertising device discussed above. The vanes are hinged near the one-third point, but no mention is made of balancing them around the pivot point. A single-function spring dampener is attached to each radial arm, allowing the vanes to rotate freely until contacting the dampener finger along the radial position of the hub arm, on either side of the element. Functionality of the vanes is such that the downwind vanes will swing out to catch the airflow and the upwind vanes will fare into the wind. The spring mechanism would be called upon to dampen the potentially violent transitional movements of the vanes.

U.S. Pat. No. 1,232,895 describes a revolving sign. The airfoil-shaped elements are not damped or constrained in any manner, and movement is produced in a rather random and haphazard way by independent movement of the elements in reaction to changes in wind direction and speed. Being unconstrained, all the elements will align simultaneously with the wind. The description suggests that the device be put near a window with an electric fan blowing on it—perhaps in order for the interference between the fan and the outside wind to cause the device to move. The intent is obviously for the display of advertising as opposed to a continuously rotating mechanism.

U.S. Pat. No. 1,511,965 describes an advertising device that uses simple flat elements that swing broadside to the wind in the downwind phase and swing outward to streamline into the wind on the upwind leg. Several armature configurations a represented. The most obvious feature of this design is its unbalanced nature. A great deal of strain will be encountered in the main pivot point and support structure, and the elements that swing outward will momentarily flail wildly in the wind. Centrifugal force will also take a toll in swinging the panels into the wind—acting as an effective brake. This type of system would tend to run very sporadically, in fits and starts.

U.S. Pat. Nos. 1,534,634 and 1,534,635 describe a wind sign that is similar to the revolving sign described in U.S. Pat. No. 1,232,895 in that the elements rotate freely and independently. Based upon the description (i.e., ". . . it has been found by actual use of the device that all of the vanes will point in substantially the same direction when subjected to the wind, and the pressure of the wind upon the vanes causes the rotatable frame to rotate slowly . . . "), if all the vanes point simultaneously into the wind, there is no imbalance of forces to produce rotation. The patent presents information on the panels, without considering the aerodynamic principles that would permit the unit to revolve consistently.

U.S. Pat. No. 2,030,769 describes an advertising device that uses drag downwind and fairing upwind and is closely similar to the advertising device described in U.S. Pat. No. 1,511,965 discussed above. Because of the way the figures are illustrated, and the fact that the units are shown rotating in opposite directions, this is not immediately obvious. It will be subject to the same balance issues and performance shortcomings of the earlier design.

U.S. Pat. No. 2,076,784 describes a display device, of the "roof ventilator" type, that is mentioned here because it shows the presentation of a three-dimensional object. U.S. Pat. No. 3,292,319 describes a sea gull guard, with a different intended use, but one version shown gives an example of reactive elements being used to produce crosswind lift exclusively. FIG. 4 in that patent shows a rotating apparatus with reactive elements (vanes) constrained between a ninety degree free movement range, with the downwind drag phase (startup power) being inefficient due to the forty-five offset of the vane. However, since the unit is intended to be used in areas of steady wind (e.g., marinas) and given its long moment arm, lightweight mass, and low wind resistance mounting radial, self-starting issues should not be a concern.

The foregoing illustrates that none of the prior art device reviewed above explore the concept of accommodating shaped, two-dimensional or three-dimensional reactive elements and the use of standardized mounting features for easy interchangeability. In addition, none address mechanisms for avoiding storm damage and most appear vulnerable to high winds. Furthermore, none of the devices address means of adjusting element position or optimizing efficiency. Although not a top priority, higher efficiency translates into better performance at lower wind speeds. Moreover, none of the devices use the five-phase movement described in U.S. patent application Ser. No. 10/178,209.

The two most common approaches in the prior art reviewed above are (a) drag 180 degrees, fair 180 degrees, and (b) crosswind lift only. For the first approach, the elements in the above designs rotate 180 degrees on their axes, create drag thrust on the downwind phase, and use some strategy to reduce the drag on the upwind leg. Units using this approach tend to turn more slowly, but start more easily, than lift-only designs. For the second approach, the reactive elements in the above designs typically rotate 90 degrees or 45 degrees both sides of a line perpendicular to the radial arm. These systems do not have the high-torque start-up characteristics of the drag-only designs, but once started tend to rotate faster. Thus, existing RDAs have some drawbacks that need to be overcome, and so a need exists for an RDA that overcomes those concerns, preferably an RDA incorporating benefits of modern aerodynamic design and performance theory.

SUMMARY OF THE INVENTION

It is an objective of this invention to overcome the forgoing and other disadvantages of prior art rotating display devices. This object is achieved by providing a rotating display apparatus (RDA) having "free flying" wind-reactive elements that self position according to the local dynamic conditions to which they are subjected, thus creating a condition of equilibrium under which a highly efficient means of wind energy extraction may be established. More particularly, the RDA includes a rotor mounted on a support structure for rotation about a vertical rotational axis. At least two wind-reactive elements (airfoils or non-airfoils) mounted pivotally on the rotor (preferably more than two) cause the rotor to rotate under influence of the wind. The wind-reactive elements are mounted on the rotor so that they are free to pivot between first and second pairs of stop positions (i.e., preset first and second limits of pivotal movement set by stop mechanisms). That arrangement enables the wind-reactive elements to align according to the wind as they orbit the rotational axis, thereby achieving better conversion of wind energy to useable rotational energy during five phases of each revolution.

The dynamic phase lag effect of the free flying wind-reactive elements creates a "virtual stop." Recall the Law of Conservation of Angular Momentum and consider its influence in combination with airfoil responsiveness to the instantaneous force of the true relative wind (TRW) acting on an airfoil. The result is that the wind-reactive elements resist rotational changes along their pivotal axes and shift out of phase relative to rotor position. That is what the stop mechanisms do also. The stop mechanisms cannot be completely eliminated, however, because they are required during start-up, operation at low speed, heavy load conditions, turbulence, and wind direction shifts requiring reorientation and stabilization of the system. The stop mechanisms are important in getting the system up to equilibrium speed.

To paraphrase some of the more precise language appearing in the claims and introduce the nomenclature used, a rotating display apparatus constructed according to the invention includes a support structure, a rotor mounted rotatably on the support structure for rotation about a vertically disposed rotational axis, and at least two wind-reactive elements on the rotor on which a user may display information or mount ornamental shapes. The wind-reactive elements function as means for causing the rotor to rotate about the rotational axis in response to wind passing the rotating display apparatus.

The two wind-reactive elements include a first wind-reactive element that has a first leading edge and a first trailing edge, a first central axis extending horizontally through the first leading edge and the first trailing edge, and a pivotal axis extending vertically intermediate the first leading edge and the first trailing edges. The first wind-reactive element is mounted on the rotor for pivotal movement about the first pivotal axis between a first pair of stop positions. The two wind-reactive elements also include a second wind-reactive element that has a second leading edge and a second trailing edge, a second central axis extending horizontally through the second leading edge and the second trailing edge, and a pivotal axis extending vertically intermediate the second leading edge and the second trailing edge. The second wind-reactive element is mounted on the rotor for pivotal movement about the second pivotal axis between a second pair of stop positions.

According to a major aspect of the invention, each of the first and second wind-reactive elements is mounted on the rotor so that each of the first and second wind-reactive elements is free to pivot between a respective one of the first and second pairs of stop positions as the rotor rotates about the rotational axis. That arrangement enables the wind-reactive elements to align their central axes continually according to the wind and impart rotational movement to the rotor as they orbit the rotational axis. Although the device has demonstrated the capability of starting and running with one element only, preferably, the RDA has more than two wind-reactive elements. Variable stops and constrictive dampening mechanisms may be employed that can provide better efficiency and protection in heavy wind conditions.

In terms of its many advantageous design features, the RDA of the invention uses two or more self-positioning wind-reactive elements that achieve better conversion of wind energy to useable rotational energy. The RDA needs no cams, gears, levers, or other mechanisms to position the wind-reactive elements, thereby reducing design complexity, minimizing frictional overhead, and increasing working efficiency. The energy transfer cycle is optimized by the application of aerodynamics based on airplane and helicopter airfoil flying and stalling characteristics and the physics of conservation of rotational energy. T he wind-reactive elements optimize each phase in the rotational cycle, using four distinct methods of applying motive force to the rotor armature.

Wind forces and armature-constraining action alone establish wind-reactive element positions. The wind-reactive elements rotate freely through a maximum arc of approximately 90 degrees, bounded by stop mechanisms. The wind-reactive elements' span of travel is from a radial line along the mounting arm (radially aligned relative to the vertical rotational axis) to a perpendicular position (tangentially aligned relative to the rotational axis). The design allows for each wind-reactive element to set its own instantaneous angle and to adjust to conditions of relative wind, wind shift, and so forth occurring outside and within the RDA, without external adjustments or mechanisms, wind vanes, or other controlling devices. Individual wind-reactive elements adjust to local conditions based on changes of rotor speed, turbulence, true relative wind, and other factors affecting each of them independently.

The RDA design is scalable, both in terms of overall size and in terms of the number of wind-reactive elements utilized. It may be configured in a smaller radius for higher RPM operation, or larger diameter for lower RPM operation and higher torque. The RDA design allows for easy aesthetic placement in the landscape.

The RDA design employs a five-step sequence:

1. Upwind Lift Phase. This begins approximately in the upwind position and continues to approximately 60 degrees past it, depending on wind and rotor speed conditions.

2. Downwind Drag Phase. This begins at approximately 60 degrees downwind and continues to around the 120 degree position.

3. Transitional Phase. At about the 120 degree position, the airfoil rotates its orientation by 90 degrees and converts its rotational energy into rotor thrust by the law of conservation of rotational inertia.

4. Leeward Lift Phase. Positioned crosswind by the transitional phase, the wind-reactive element now sweeps across the leeward side of the system.

5. Upwind Phase. The wind-reactive element returns to windward, positioning itself for minimum drag.

Thus, the rotating display apparatus (RDA) of this invention provides significantly improved performance, mechanical attributes, and aesthetics. The design has the ability to utilize both drag and lift forces. This allows the device to rotate in very low and unstable wind conditions, using drag forces alone, which is an advantage to a device that may be mounted near the ground for decorative purposes. This high-torque capability also enables it to support elements that are relatively non-aerodynamic, unbalanced, or even three-dimensional (i.e., not flat). The device is also capable of running smoothly and efficiently in stronger, cleaner wind, in applications where it might be mounted on a pole or roof-top, using lift forces or a combination of lift and drag forces. Various auxiliary mechanisms may be applied to the device to improve its efficiency, enhance its operational smoothness, and protect it from the damage of high winds. The design allows for easy change and replacement of wind-reactive elements and dampeners. The following illustrative drawings and detailed description make the foregoing and other objects, features, and advantages of the invention more apparent.

BRIEF DESCRIPTION OF THE DRAWINGS

FIG. 6 is an elevation view of portions of the first wind-reactive element and the first rotor arm with a second dampener component in;

DESCRIPTION OF THE PREFERRED EMBODIMENTS

Figure 1:
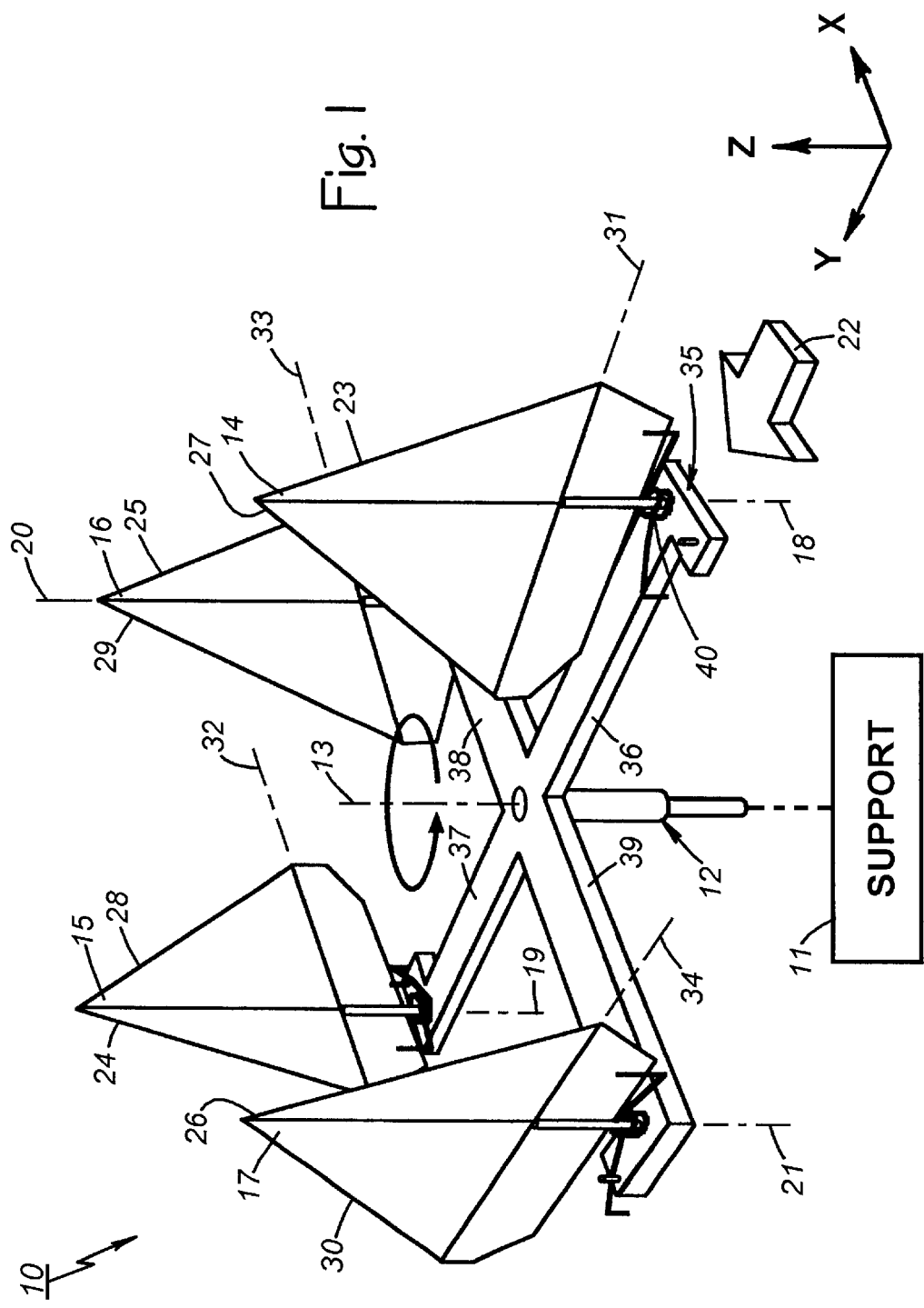
FIG. 1 of the drawings is an isometric view of a rotating display apparatus (RDA) constructed according to the invention that includes four wind-reactive elements spaced apart on the rotor at ninety degree intervals (orthogonal XYZ coordinates are included for convenience in describing the invention, with the Z axis being vertical)

FIG. 1 of the drawings show various aspects of a rotating display apparatus constructed (RDA) according to the invention (subsequently referred to as the apparatus 10). Generally, the apparatus 10 includes some type of base or support structure 11 (FIG. 1) for supporting the other components (e.g., a stand or even a pipe driven into the ground). It also includes a rotor 12 mounted rotatably on the support structure 11 for rotation about a vertical rotational axis 13, and at least two wind-reactive elements on the rotor 12. The illustrated apparatus 10 has four wind-reactive elements. They are identified in FIG. 1 as first and second wind-reactive elements 14 and 15 and third and fourth wind-reactive elements 16 and 17. They are mounted pivotally on the rotor 12 for pivotal movement about respective ones of vertically disposed pivotal axes 18, 19, 20, and 21 that are parallel to the rotational axis 13.

Although the invention works with two wind-reactive elements, more than two wind-reactive elements are preferable. The two or more wind-reactive elements function as means for causing the rotor 12 to rotate about the vertical axis 13 (as indicate by a curved arrow in FIG. 1) in response to wind (represented by an arrow 22) passing the apparatus 10. As the rotor 12 rotates, the two or more wind-reactive elements orbit the vertical axis 13 on the rotor 12 while pivoting their orientation according to the wind.

To further develop the nomenclature used in the claims, each of the wind-reactive element 14–17 is a pivotally mounted object that reacts to the wind to impart rotational motion to the rotor 12. They may be thought of as wing-like or sail-like structures, although they may be airfoils or non-airfoils, and each provides structure on which a user may display graphics or text information for promotional or other purposes, or the user can rely on the shape of the wind-reactive element structure itself as the information displayed (e.g., sailboat silhouettes). Any shape that can be balanced to turn into the wind like a weather vane and can be properly supported in the various methods illustrated herein may be utilized. Different shaped wind-reactive elements may be used in the same RDA, but diametrically opposing elements should be matched in terms of mass and wind reactance. Each wind-reactive element has a leading edge (first, second, third, and fourth leading edges 23, 24, 25, and 26), each wind-reactive element has a trailing edge (first, second, third, and fourth trailing edges 27, 28, 29, and 30), and each wind-reactive element has a central axis extending horizontally through the leading and trailing edges (first, second, third, and fourth central axes 31, 32, 33, and 34). The rotor 12 includes a lower armature 35 having four radially extending lower arms 36, 37, 38, and 39, and each of wind-reactive elements 14–17 is mounted pivotally on a respective one of the arms 36–39 with the leading and trailing edges vertically oriented in the sense that they are vertical or inclined.

The structure and operation of the rotating display apparatus 10 is similar in many respects to that of the vertical axis wind engine described in U.S. patent application Ser. No. 10/178,209 filed by the same inventor/applicant as this patent application, and that patent application is hereby incorporated herein by reference for all the information provided. Said patent application was published Dec. 12, 2003 as Publication No. US-2003-0235498-A1 and was subsequently issued as a United States Patent. As the rotor 12 rotates, the wind-reactive elements 14–17 orbit the vertical axis 13 on the rotor 12 while self positioning themselves between radially aligned and tangentially aligned stop positions established by stop mechanisms that are also referred to herein as dampening mechanisms. Only the dampening mechanism 40 for the first wind-reactive element 14 is identified in FIG. 1 for illustrative convenience.

The stop positions and stop mechanisms are similar in many respects to the stops described in the vertical axis wind engine patent application referenced above. In terms of the claims in this patent application, the central axis of each of the wind-reactive elements is aligned radially in the radially aligned position of the wind-reactive element, and this is referred to as a first stop position of that wind-reactive element. The central axis of each of the wind-reactive elements is aligned tangentially in the tangentially aligned position of the wind-reactive element, and this is referred to as a second stop position of that wind-reactive element. The first and second stop positions of each the wind-reactive elements form form a pair of stop positions for each of the wind-reactive elements.

As a further idea of size and construction, the illustrated apparatus 10 is about two feet in overall diameter. Of course, the precise size may vary within the scope of the claims according to a particular application. The rotor 12 is fabricated from a rigid material (e.g., plastic, metal, or wood) and the wind-reactive elements are fabricated so that they maintain their shape (e.g., plastic, metal, wood, or a framed cloth or flexible sheet material).

Figure 2:
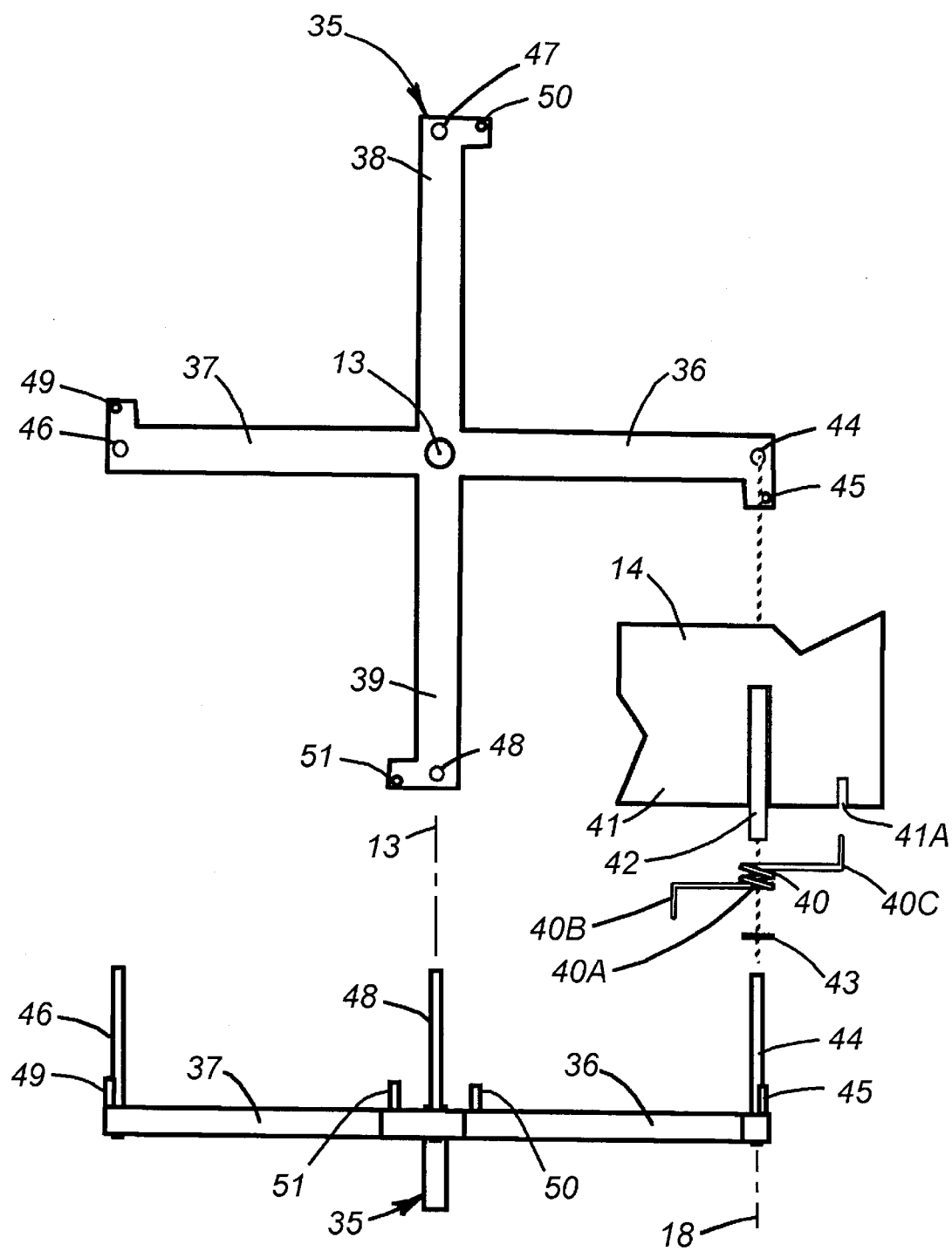
FIG. 2 is a top plan view of the RDA rotor super-imposed above a front elevation view of the rotor and a front elevation view of a portion of the first wind-reactive element to show the mounting of the first wind-reactive element on the first lower rotor arm.

FIG. 2 illustrates further construction details. It is a top plan view of the lower armature 35 of the rotor 12 superimposed above a front elevation view of the lower armature 35 and a front elevation view of a portion of the first wind-reactive element 14. The four wind-reactive elements 14–17 are similar and so only details of the wind-reactive element 14 and its mounting are described in further detail. The first wind-reactive element 14 includes a main portion 41 and a hollow pivot tube 42 connected fixedly to the main portion 41. The pivot tube 42 (e.g., a 0.375 diameter metal tube) assembles with a dampening mechanism 40 and a washer 43 over an upstanding first mounting post 44. The pivot tube 42 slides over the post 44. The dampening mechanism 40 takes the form of a spring formed from spring steel to have a helical portion 40A and two outwardly extending first and second legs 40B and 40C that bear against the main portion 41, the arm 36, and a stop post 45 at various positions of the first wind-reactive element 14 to inhibit movement of the first wind-reactive element 14. The second leg 40C is held within a slot 41A in the main portion 41 by suitable means. Second, third, and fourth mounting posts 46–48 and second, third, and fourth stops posts 49–51 function the same way with the second, third, and fourth wind-reactive elements 15–17.

Figure 3:
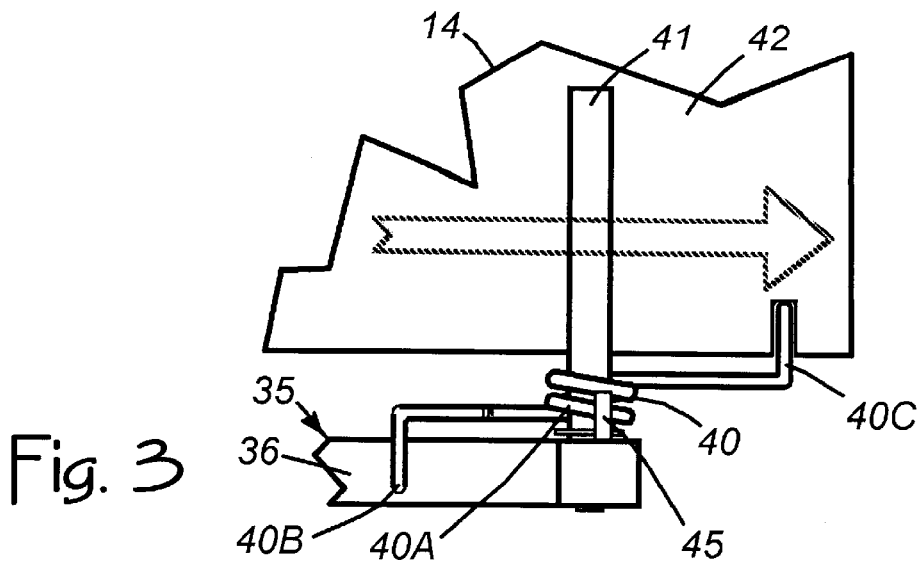
FIG. 3 is an enlarged elevation view of portions of the first wind-reactive element and first rotor arm showing pivot tube and dampener (i.e., stop mechanism) details.
Figure 4A:
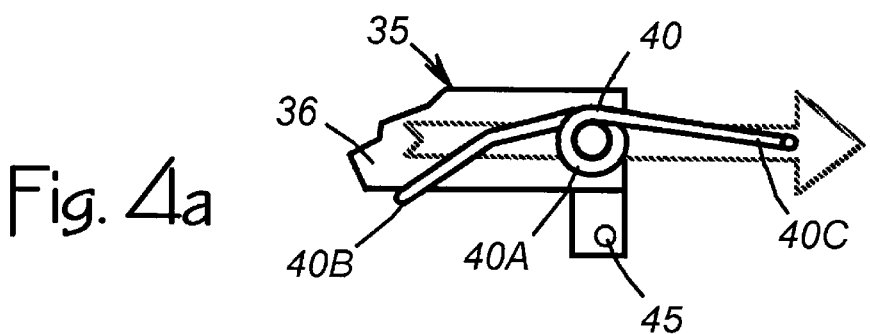
FIG. 4a is a top plan view of a portion of the first rotor arm with the first dampener in the radially aligned position shown in FIG. 3.
Figure 4B:
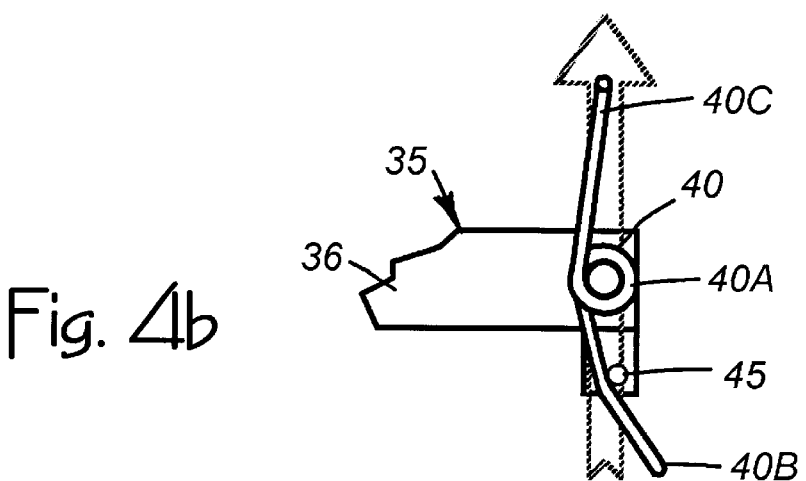
FIG. 4b is a top plan view of a portion of the first rotor arm with the first dampener in a tangentially aligned position.

FIGS. 3, 4a, and 4b show the dampening mechanism 40 in various positions, with arrows that indicate the alignment of the central axis 31 of the first wind-reactive element 14. FIG. 3 is an enlarged elevation view of a portion of the first wind-reactive element 14 and a portion of the lower armature 35 of the rotor 12, with the dampening mechanism 40 mounted in between. The central axis 31 of the first wind-reactive element 14 is radially aligned (the first stop position). FIG. 4a is a top plan view of the same structure but with the main portion 41 omitted for illustrative convenience. The central axis 31 is radially aligned. FIG. 4b is a top plan view similar to FIG. 4b except that the central axis 31 is tangentially aligned (the second stop position).

The dampener mechanism 40 may be configured so that the first and second stop positions are at some other angle than true radial (nominally zero degrees) and true tangential (nominally ninety degrees). This also applies to the vertical axis wind engine described in the U.S. patent application identified above. Setting the angle for the radial stop (the first stop position) greater than the nominal radial position (e.g., 30 degrees or at the 45-degree midpoint) will have noticeable effects. The system will not have as much start-up torque and will not start as quickly and easily from a complete stop. However, there will be less movement of the wind-reactive elements and therefore less roughness of motion and noise. In addition, the system will not be as sensitive to, and turn as easily in, a light wind. However, once started the system will tend to rotate faster. In general, the greater the angle of the radial stop (i.e., the closer the first stop position approaches the tangential or second stop position), the more prevalent these effects will be. In lightweight decorative applications, and when not driving a load, some intermediate position for the radial stop may be considered optimal.

Figure 5:
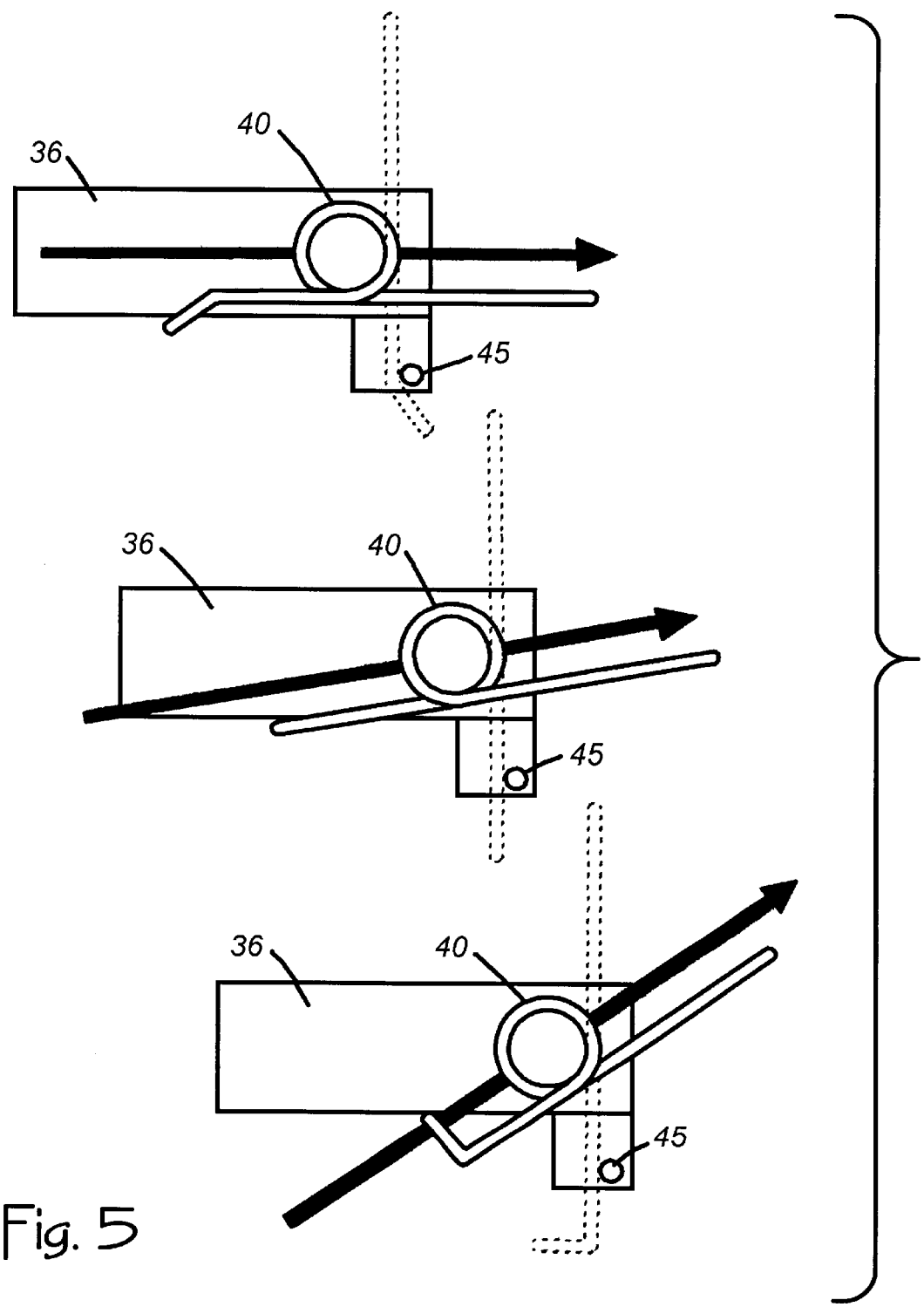
FIG. 5 is a diagram of three different radial stop angles.

FIG. 5 illustrates three different angles for the radial stop. The three heavy arrows indicate alignment of the central axis when the wind-reactive element is in the radial of first stop position. The uppermost diagram shows no offset, the middle diagram shows a 10-degree offset, and the lower diagram shows a 35-degree offset. The tangential or second stop position does not change.

Figure 6:
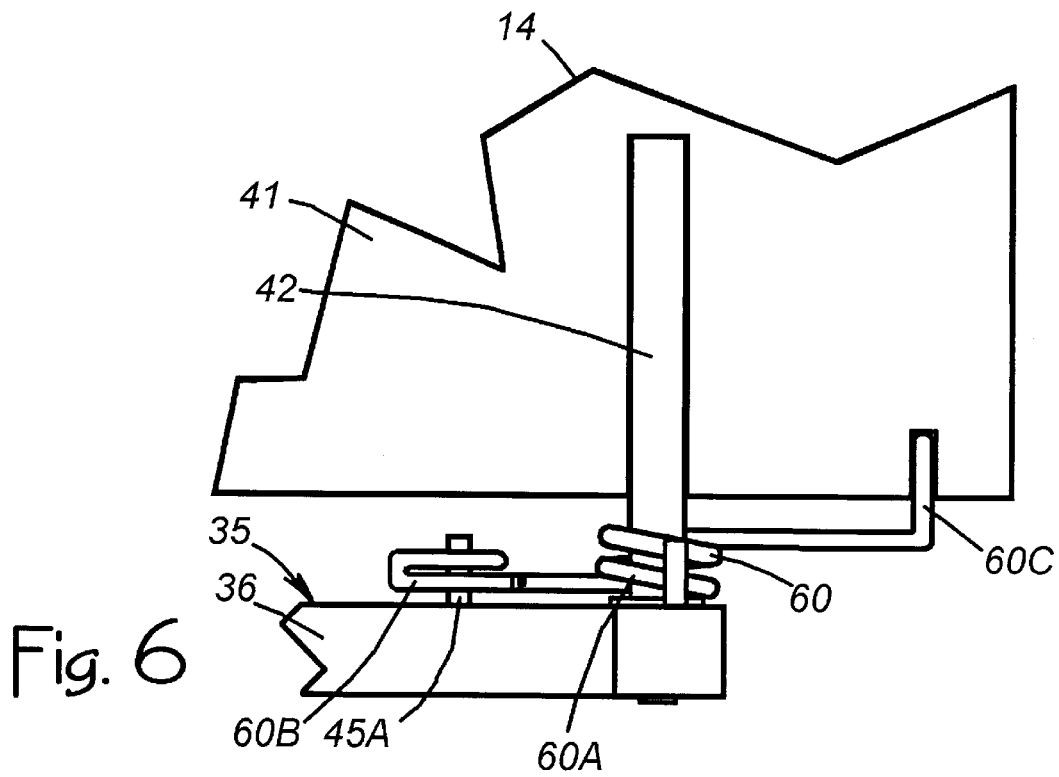
Figure 7:
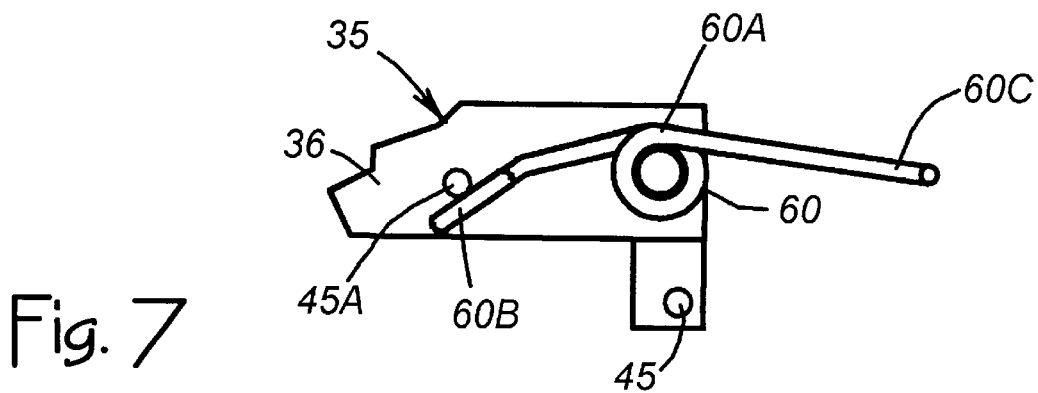
FIG. 7 is a top plan view of a portion of the first rotor arm and the second dampener component.

FIGS. 6 and 7 illustrate a different dampening mechanism 60 that utilizes a second stop post 45B. Otherwise, the dampening mechanism 60 is similar to the dampening mechanism 40, taking the form of a spring having a helical portion 60A and outwardly extending first and second legs 60B and 60C. Based upon the foregoing description and the information provided in the vertical axis wind engine patent application identified above, one of ordinary skill in the art can readily construct a rotating display apparatus according to the invention utilizing any of various different dampening arrangements.

Figure 8:
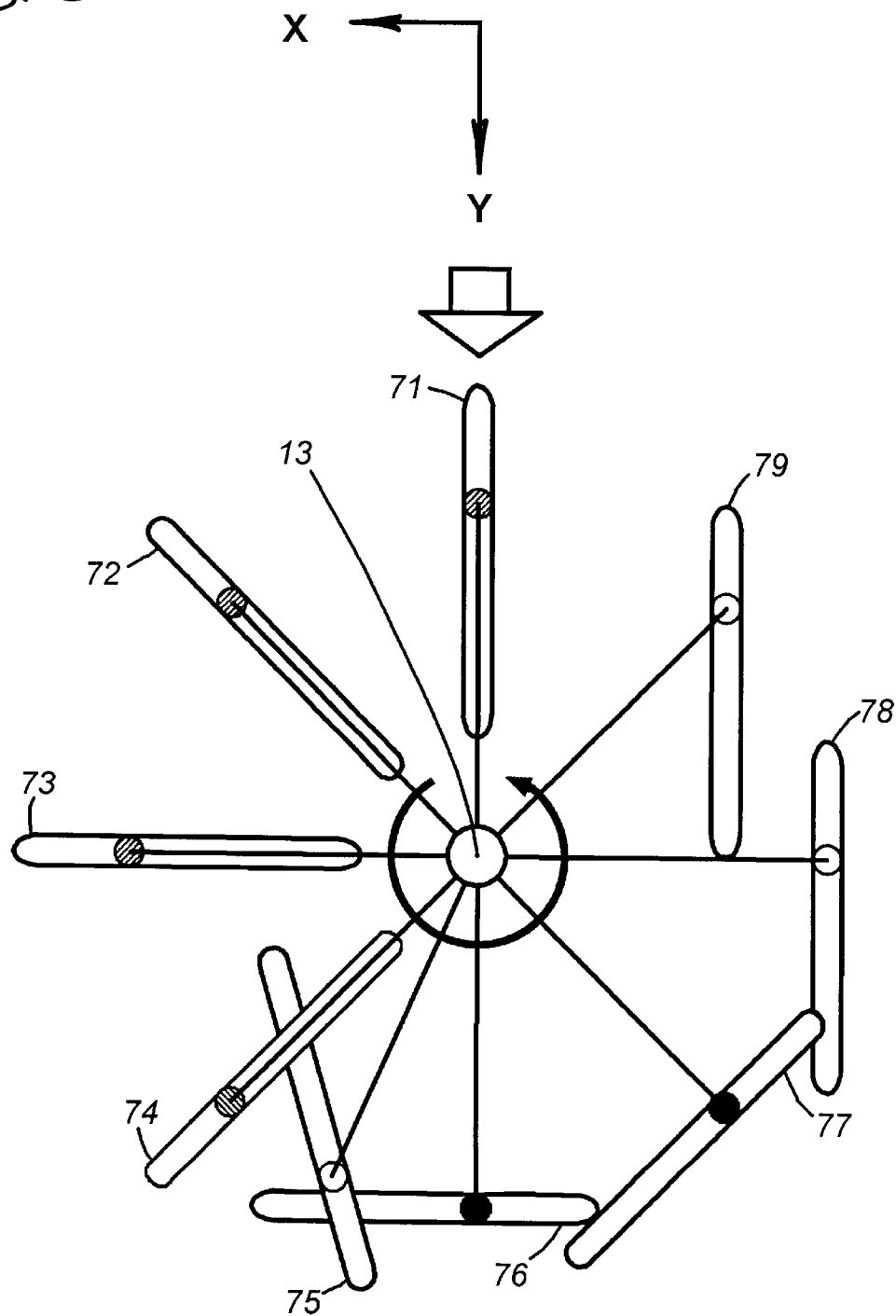
FIG. 8 is a diagrammatic representation that illustrates the various phases and free-flying aspects of a wind-reactive element as it orbits the rotational axis.

FIG. 8 is a simplified diagram showing the outline of a wind-reactive element in various positions as viewed in a horizontal plane from overhead as the wind-reactive element orbits the rotational axis 13 in the counterclockwise direction indicated by the circular arrow in FIG. 8. Outlines 71, 72, 73, and 74 of the wind-reactive element with the pivot point cross-hatched are at positions in which the wind-reactive element is constrained in the first stop position (central axis radially aligned). Outlines 76 and 77 of the wind-reactive element with the pivot point blackened are at positions in which the wind-reactive element is constrained in the second stop position (central axis tangentially aligned). Outlines 75, 78, and 79 of the wind-reactive element with the pivot point unshaded are at positions in which the wind-reactive element is unconstrained. Reference may be made to the vertical axis wind engine patent application Ser. No. 10/178,209 identified above for additional information on the various positions that is incorporated herein by reference.

Figure 9:
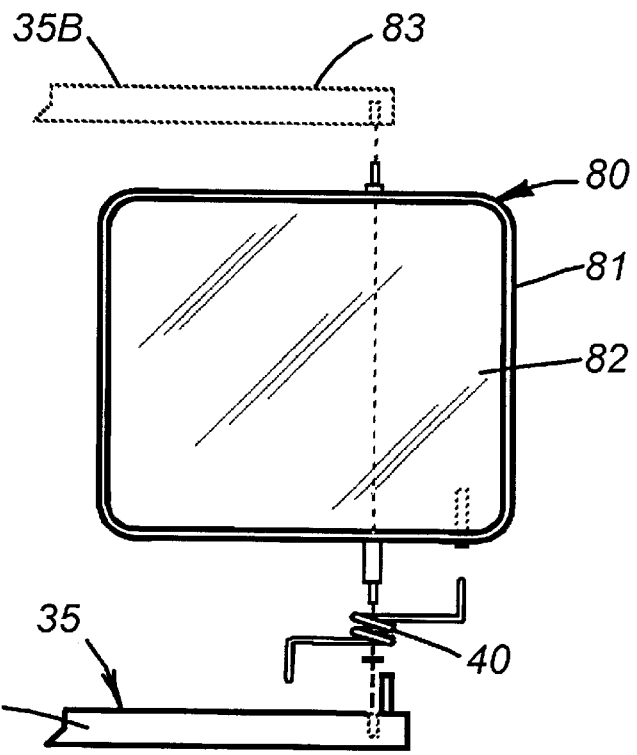
FIG. 9 an exploded elevation view that diagrams the mounting of a framed wind-reactive element on an RDA having lower and upper armatures, with a portion of the upper armature being illustrated in dotted lines.
Figure 10:
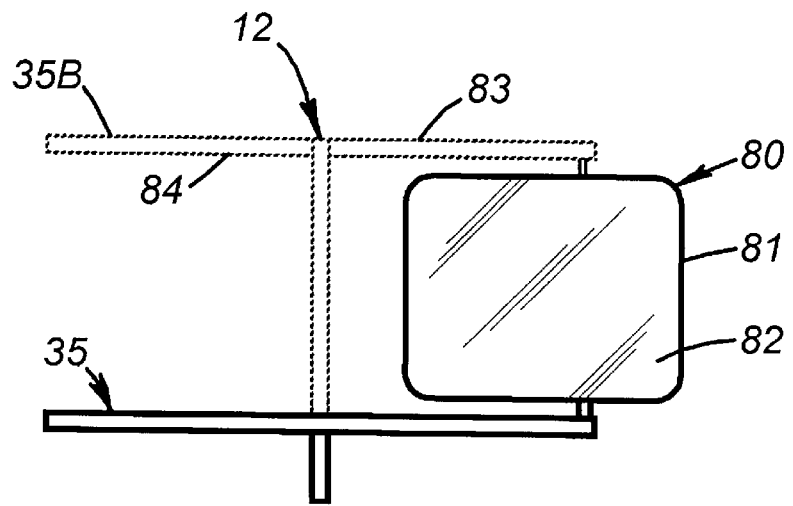
FIG. 10 is an smaller elevation view of the RDA with a framed wind-reactive element showing the full upper armature portion of the rotor.

FIGS. 9 and 10 illustrate another form of wind-reactive element 80. It is generally similar to the wind-reactive elements 14–17 and it is mounted in a similar manner on the lower rotor arm 36 of the lower armature 35 of the rotor 12 with the dampening mechanism 40. The major difference is that the wind-reactive element 80 includes a rigid frame 81 that supports a panel 82 composed of a flexible material (e.g., plastic, cloth, paper, synthetic sheet material). The frame 81 serves the function of holding the panel 82 on the lower armature 35 while keeping the panel 82 taut. FIG. 10 also illustrates the additional of an upper armature portion 35B. The upper armature portion 35B is in a position above the wind-reactive element, and it has at least first and second upper arms 83 and 84 extending radially from the rotational axis that function as means for providing additional upper support for the wind-reactive elements.

Figure 11:
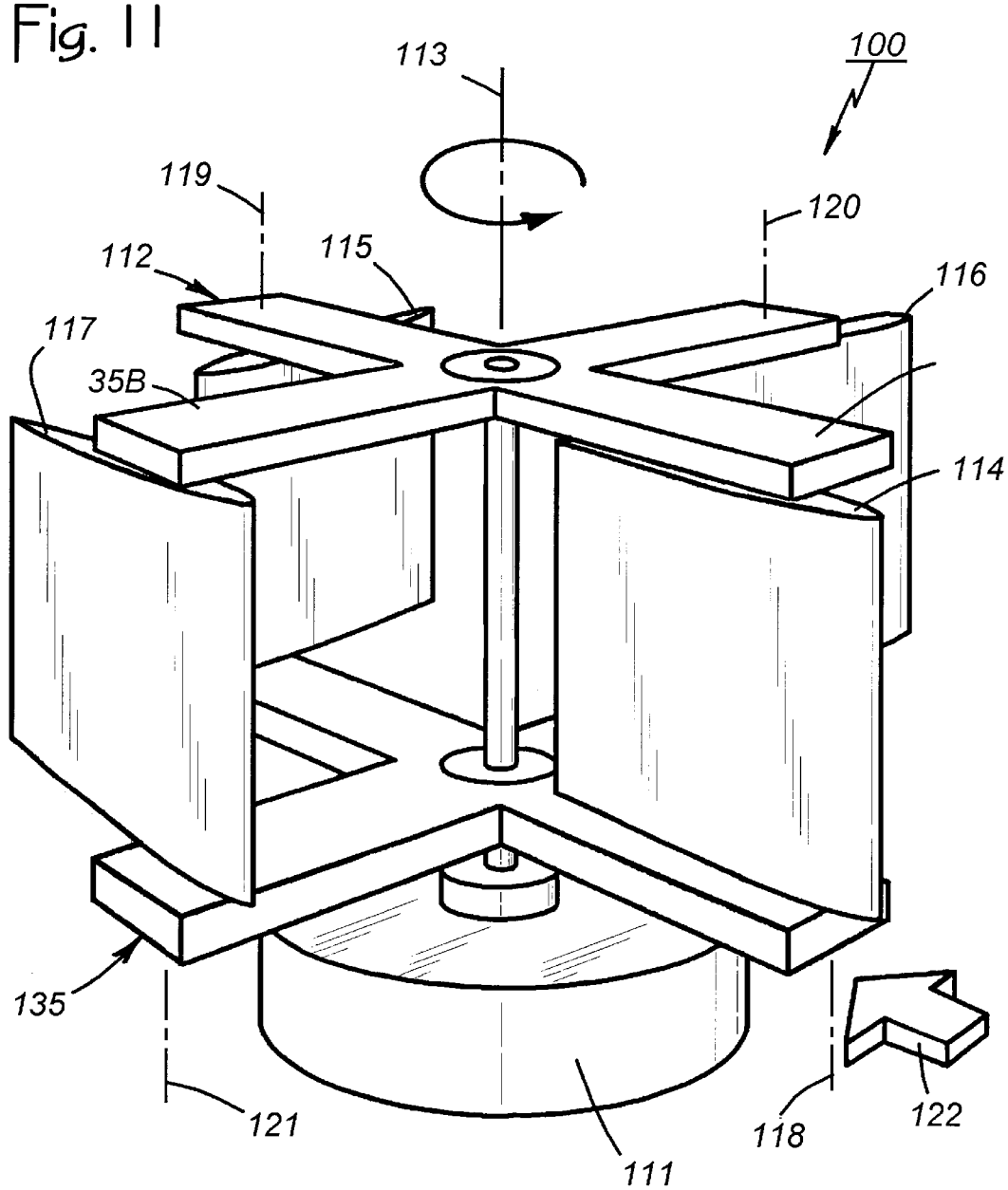
FIG. 11 is another embodiment of an RDA constructed according to the invention that includes airfoil shaped wind-reactive elements mounted between lower and upper armatures of the rotor.

FIG. 11 shows another embodiment of the invention in the form of a rotating display apparatus 100. It is similar in many respects to the apparatus 10. For convenience, numerals designating parts of the apparatus 100 are increased by one hundred over those designating similar or related parts of the apparatus 10.

The apparatus 100 includes a support 111 and a rotor 112 mounted rotatably on the support 111 for rotation about a vertical rotational axis 113. Lower and upper armature portions 135 and 135B of the rotor 112 support four wind-reactive elements 114, 115, 116, and 117 so that the wind-reactive elements can pivot about pivotal axis 118, 119, 120, and 121 between pairs of stop positions as the wind-reactive elements impart rotational movement to the rotor 112 orbit the rotational axis 113 in response to the wind 122. Dampening mechanisms are included to set the stop positions, but they are now shown for illustrative convenience. The major difference in the apparatus 100 is that the wind-reactive elements 114–117 are airfoils, similar in shape to the airfoils described in the vertical axis wind engine patent application identified above.

Figure 12:
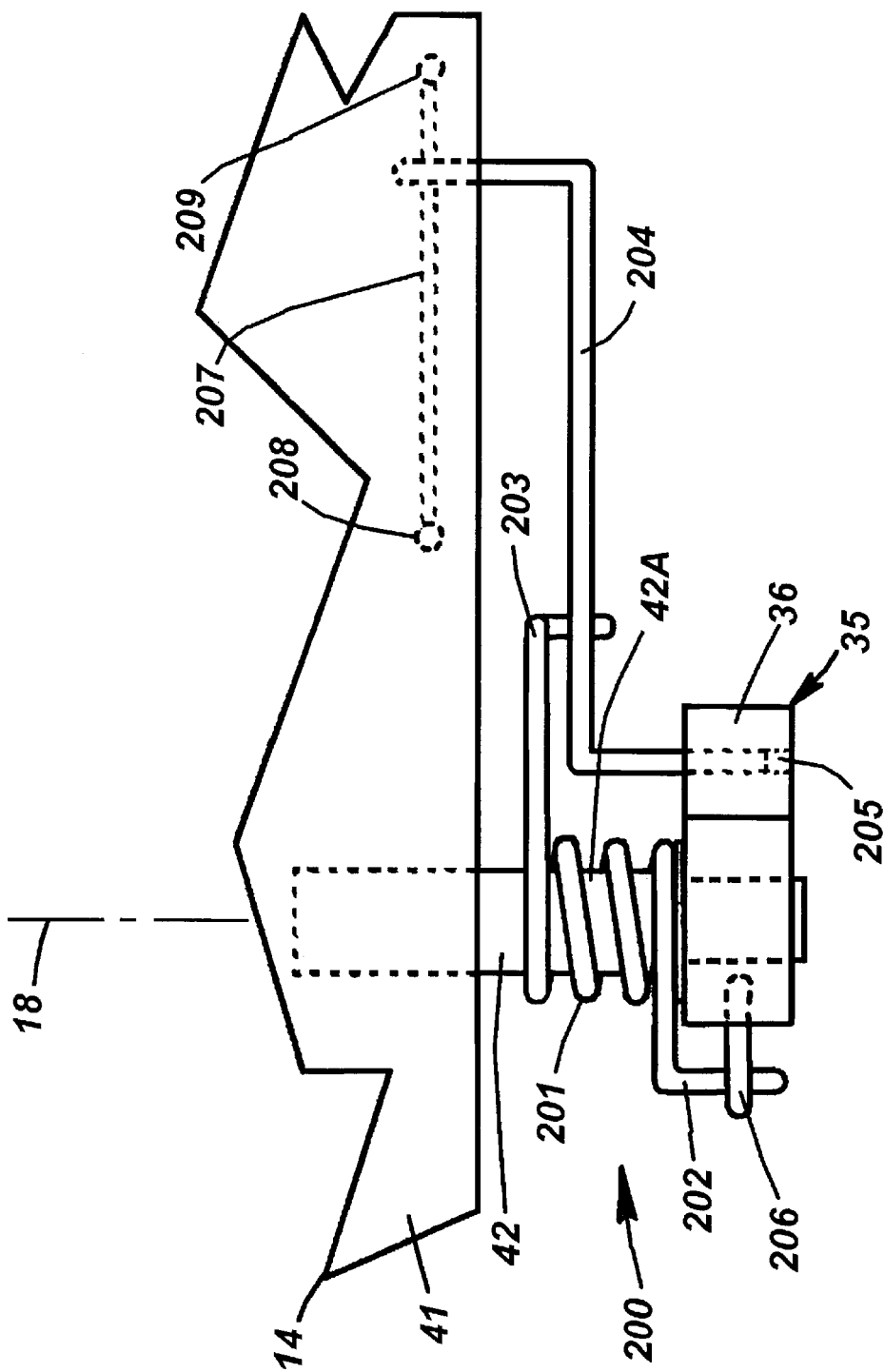
FIG. 12 is an enlarged elevation view of a constrictor dampener mechanism constructed according to the invention as it appears mounted on an RDA constructed according to the invention.
Figure 13:
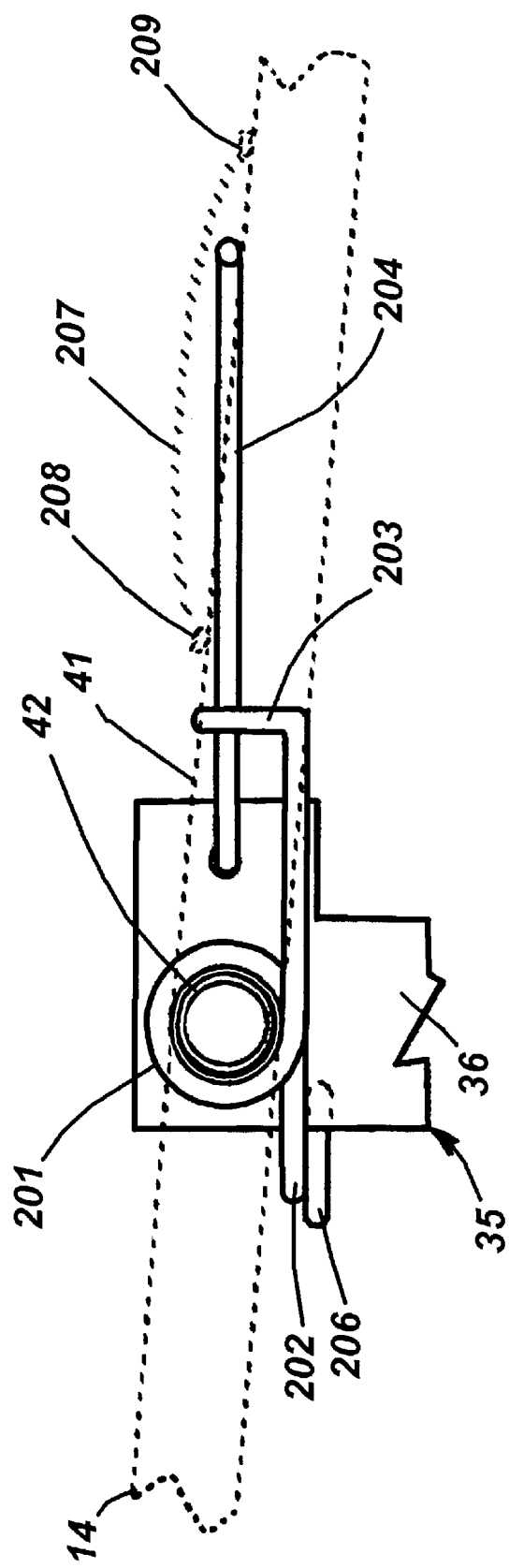
FIG. 13 is a top plan view of the constrictor dampener mechanism.
Figure 14:
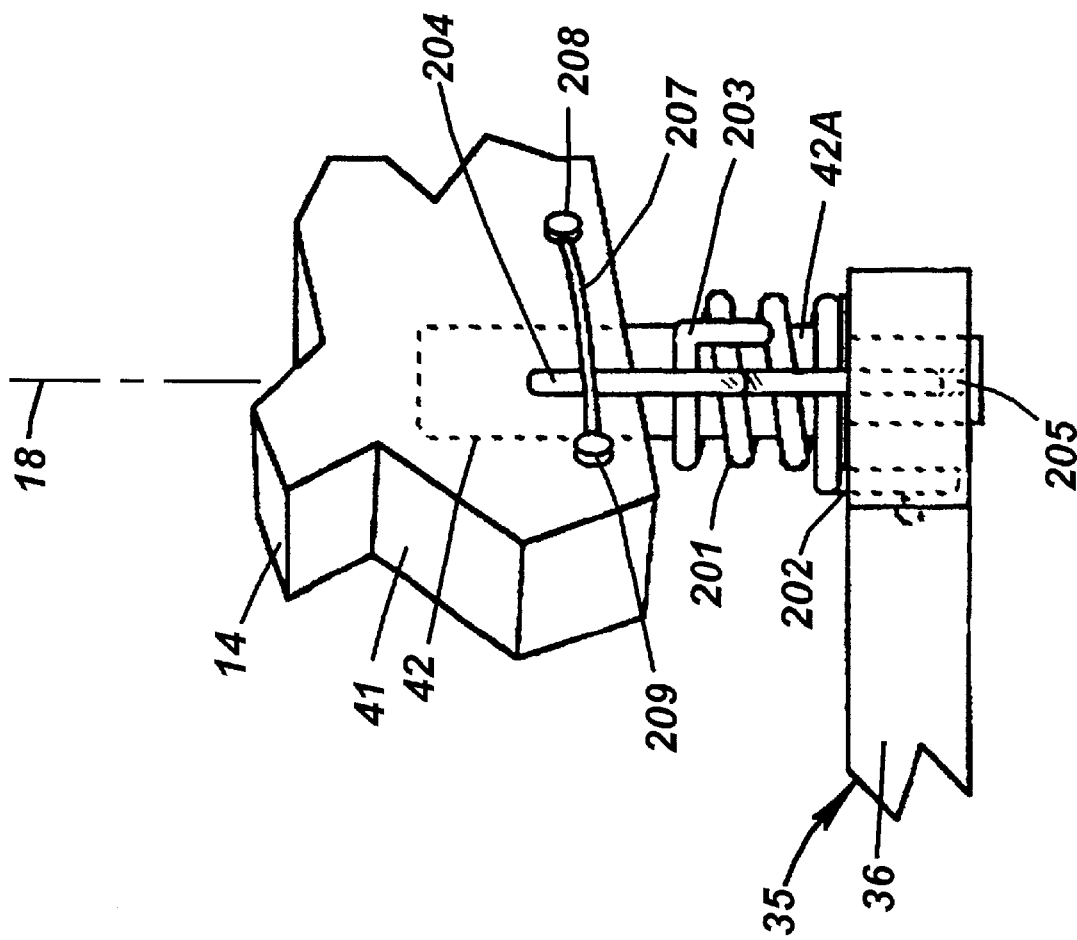
FIG. 14 is an elevation view of the constrictor dampener mechanism with the rotor and wind-reactive element in different positions to show further details of its design.

FIGS. 12–14 show details of another form of dampener mechanism 200. It is illustrated installed with the wind-reactive element on the arm 36 of the lower armature 35. The dampener mechanism 200 includes a spring having a helically shaped portion, referred to subsequently as constrictor 201, and first and second legs 202 and 203 extending outwardly from the helically shaped portion 201. The constrictor 201 fits with close tolerance over the pivot tube 42 so that the pivot tube 42 can pivot freely with the constrictor 201 in its normal resting state, until the first and second legs 202 and 203 are moved circumferentially so that the constrictor 201 constricts radially against the pivot tube 42. At least the pivot tube portion 42A (FIGS. 12 and 14) within the helically shaped portion 201 is cylindrically shaped so that the pivot tube 42 and constrictor 201 interact that way.

A position lever 204 pivots freely in a hole 205 in the lower leg 36. When the main portion 41 of the wind-reactive element 14 moves into contact with the position lever 204, pressure is applied by position lever 204 to the constrictor extension lever provided by the leg 203. The action of the position lever 204 pressing on the leg 203 while leveraged against a spring support extension provided by the leg 202 and constrained by an anchor stop 206 secured to the lower arm 36 of the lower armature 35, causes the constrictor 201 to constrict around the pivot tube 42 (i.e., reduce in radial size), thereby acting as a brake. The more force that the main portion 41 of the wind-reactive element 14 applies to the position lever 204, the more holding force that is applied by the constrictor 201 on the pivot tube 42. As soon as force from the main portion 41 of the wind-reactive element 14 is removed from the position lever 204, the constrictor 201 increases in radial size and thereby allows the pivot tube 42 and the main portion 41 of the wind-reactive element 14 to pivot freely in the reverse direction. The position lever 204 can be loosely constrained alongside the main portion 41 of the wind-reactive element 14 by a lightweight wire or strap 207 that is attached to the main portion 41 with rivets or other suitable means at points 208 and 209.

The constrictor dampening mechanism 200 significantly increases system smoothness and efficiency and it may also be incorporated into the vertical axis wind engine design mention previously. Over-swing and spring bounce during 90-degree transitions of the wind-reactive element 14 are reduced or eliminated because the system is critically damped. The constrictor dampening mechanism 200 can be used in either or both the radial and tangential stop positions, but it is most useful in dampening the excessive energies generated in the transition phase (i.e., tangential stop position). A simple spring radial stop (or the dynamic stop positioning dampener mechanism described subsequently with reference to FIGS. 15 and 16) may be used in conjunction with a constrictor dampener mechanism in the tangential position.

The system is both position and force sensitive. A more aggressive impact of the wind-reactive element 14 on the position lever 204 produces a more forceful braking action. Likewise, low energy conditions produce more gentle braking action. Therefore, the system performs the desired dampening function of stopping the wind-reactive element 14 in the correct aerodynamic position regardless of instantaneous conditions.

By use of the constrictor dampener mechanism, rotational energy from the wind-reactive element 14 is transferred to the armature system more efficiently. Other spring systems, by comparison, transfer some of the rotational energy to the rotor, but excess energy that cannot be instantaneously absorbed by the system is stored in the spring and returned to the wind-reactive element, causing performance problems. Pneumatic and hydraulic dampeners convert excess energy into heat, which is lost to the system. The constrictor dampener mechanism, however, creates a momentary physical connection between the wind-reactive element 14 and the armature 35 that transfers a maximum amount of energy to the rotor. A small amount of heat is lost during the braking operation, but little or no energy is fed back to the wind-reactive element 14.

Efficient rotational energy transfer facilitates transition into an equilibrium state and avoids intermittent and jerky movement by more quickly accelerating the rotor into higher RPM conditions where the wind-reactive element can stabilize. The constrictor dampening mechanism is relatively low cost, simple, and maintenance free, and the stopping position of the wind-reactive element 14 is easily set by adjusting the shape of the position lever 204 or the leg 203.

Figure 15:
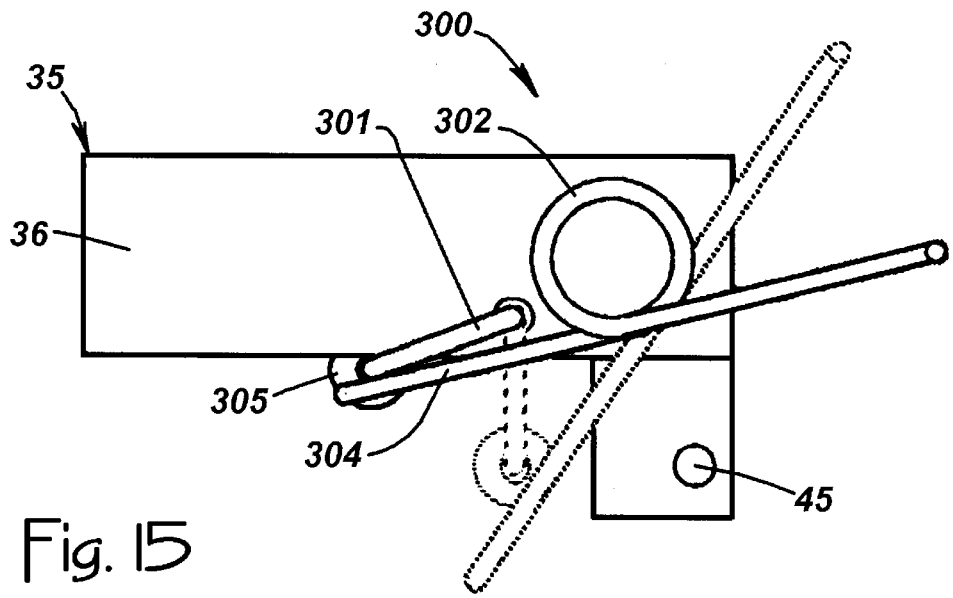
FIG. 15 is an enlarged top plan view of a self-adjusting dampener mechanism.
Figure 16:
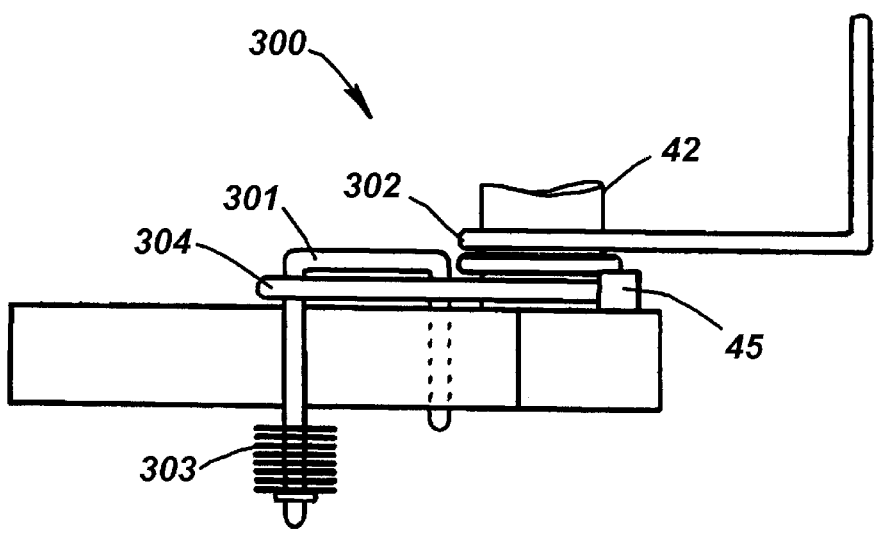
FIG. 16 is an elevation view of the self-adjusting dampener mechanism.

FIGS. 15 and 16 show a dynamic stop positioning dampener mechanism 300 illustrated installed with the wind-reactive element on the arm 36 of the lower armature 35 of the apparatus 10. This mechanism is intended to optimize operation of the system at higher RPMs without compromising the low-RPM torque properties by offsetting the radial stop position as illustrated in FIG. 5. The radial stop position set by a pivoting first stop 301 is moved relative to the lower arm 36 of the lower armature 35 according to rotor speed by increasing pressure on the extension leg 304 of the spring 302 using centrifugal force of a weight 303. The tangential second stop 45 is not affected by this arrangement.

The dotted lines in FIG. 15 represent a second position of the weight 303 and the resulting radial stop position. Without the dynamic stop positioning dampener mechanism 300, the wind-reactive element tends to swing the full 90 degrees between the radial and tangential stop positions, and at some point just can not make the transitions in time, causing performance degradation. The mechanism 300 tightens up the free movements of the wind-reactive elements according to rotor speed. Only the radial stop needs to be adjusted dynamically in this manner. One analogy is the centrifugal ignition advance on an engine that retards for slow speed torque and advances for smooth higher speeds. The dynamic stop position method employed can be used to complement the constrictor dampener mechanism 200 or the storm protection mechanism 400 (described subsequently with reference to FIGS. 17A through 17C) on an RDA or a vertical axis wind engine. In other words, the various dampeners can be used in combination rather than being mutually exclusive solutions.

Figure 17A:
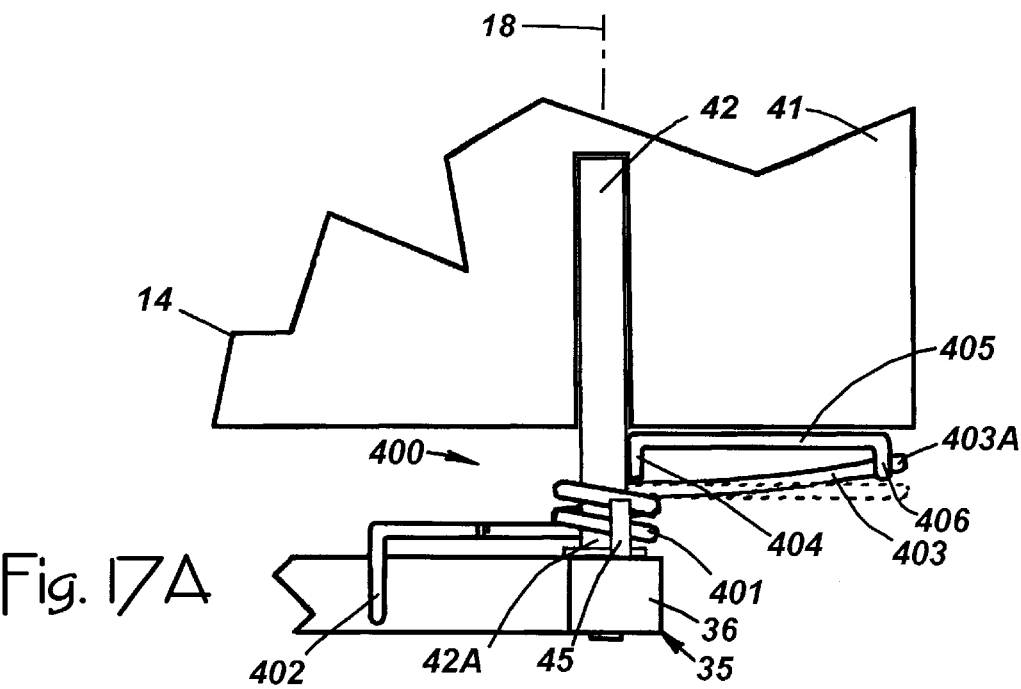
FIG. 17A is an enlarged elevation view of automatically disengaging dampener mechanism constructed according to the invention as it appears mounted on an RDA constructed according to the invention.
Figure 17B:
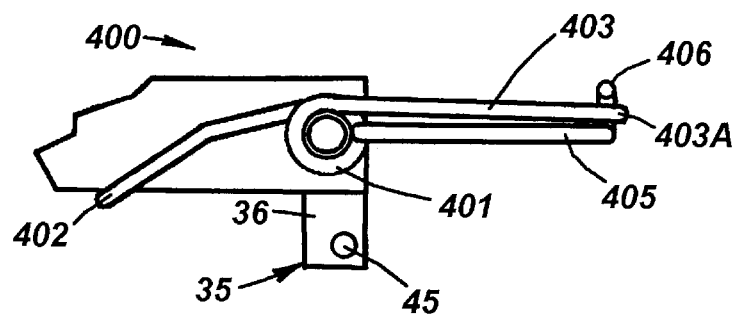
FIG. 17B is a top plan view of the automatically disengaging dampener mechanism.
Figure 17C:
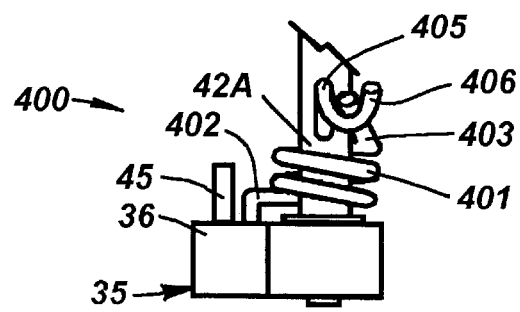
FIG. 17C is an elevation view of the automatically disengaging dampener mechanism with the rotor and wind-reactive element in different positions to show further details of its design.

FIGS. 17A, 17B, and 17C show details of another dampener mechanism 400 illustrated installed with the wind-reactive element on the arm 36 of the lower armature 35 of the apparatus 10. It is designed to automatically disengage in high wind conditions for storm protection, and it includes a spring having a helically shaped portion 401, and first and second extension legs 402 and 403 extending outwardly from the helically shaped portion 201. A right angle mounting portion 404 of a spring dampener support bracket assembly 405 is attached to the pivot tube 42 by soldering or other suitable means of adherence. The bracket assembly 405 is terminated on the outer end (opposite the right angle mounting portion 404) by a hook-shaped bend 406 which cradles the second extension leg 403. The second extension leg 403 is supported by the hook-shaped bend 406 at a level higher than its normal free position which is indicated in FIG. 17A in dashed lines.

The length of the second extension leg 403 is set so that the length 403A protruding beyond the hook-shaped bend 406 will be pulled clear of the hook 406 if the first extension leg 402 impacts either the armature 35 or the tangential stop post 45 with sufficient force to otherwise produce damage to any of the mechanism illustrated. If the second extension leg 403 is pulled clear of the hook-shaped bend 406, the second extension leg 403 will rest clear of the bracket assembly 405 (in the position indicated by dashed lines in FIG. 17A) and allow the main portion 41 and pivot tube 42 of the wind-reactive element 14 to pivot freely into the wind.

Subsequently, the rotation of the armature 35 will be slowed or stopped. The bracket assembly 405 is mounted on the pivot tube 42 at such a height as to pull the helical portion 401 upwards slightly until it contacts the right angle mounting portion 404. This establishes clearance of the first extension leg 402 above the armature 35. When the second extension leg 403 is freed from the hook-shaped bend 406 and moves to the position shown in dashed lines, the helical portion 401 and first extension leg 402 also drop, allowing free clearance between the right angle mounting portion 404 and the spring portions 401, 402, and 403, allowing 360-degree rotational freedom of the wind-reactive element 14.

The dampener mechanism 400 may be said to act as a "mechanical circuit breaker." It protects components of the RDA apparatus 10 from severe shock and subsequent damage. Safety release (i.e., disengagement of the second extension leg 403) can occur in either direction. Fully unobstructed 360-degree pivotal freedom of the wind-reactive element 14 is achieved after release, and the second extension leg 403 is easily repositioned in the hook-like bend 406 following release due to shock. The mechanism 400 holds the first extension leg 402 clear of the armature 35 for reduced friction during normal operation. Standardization may be accomplished for use with any shape of wind-reactive element by using the same size pivot tubes (e.g., the pivot tube 42), the same size bracket assemblies (e.g., the bracket assembly 405), and the same size spring assemblies (e.g., the helical portion 401 and first and second extension legs 402 and 403).

Thus, the invention provides a rotating display apparatus with at least two and preferably more self-positioning wind-reactive elements providing significantly improved performance, mechanical attributes, and aesthetics. Although exemplary embodiments have been shown and described, one of ordinary skill in the art may make many changes, modifications, and substitutions without necessarily departing from the spirit and scope of the invention.

What is claimed is:

1. A rotating display apparatus, comprising:
   a support structure, a rotor mounted rotatably on the support structure for rotation about a vertically disposed rotational axis, and at least two wind-reactive elements on the rotor that a user may use for display purposes, which wind-reactive elements function as means for causing the rotor to rotate about the rotational axis in response to wind passing the rotating display apparatus;
   wherein the two wind-reactive elements include a first wind-reactive element that has a first leading edge and a first trailing edge, a first central axis extending horizontally through the first leading edge and the first trailing edge, and a pivotal axis extending vertically intermediate the first leading edge and the first trailing edges, which first wind-reactive element is mounted on the rotor for pivotal movement about the first pivotal axis between a first pair of stop positions, without the first wind-reactive element including a counterbalancing structure extending ahead of the first leading edge and so that the first leading edge is located opposite the first trailing edge relative to the first pivotal axis and;

wherein the two wind-reactive elements include a second wind-reactive element that has a second leading edge and a second trailing edge, a second central axis extending horizontally through the second leading edge and the second trailing edge, and a pivotal axis extending vertically intermediate the second leading edge and the second trailing edge, which second wind-reactive element is mounted on the rotor for pivotal movement about the second pivotal axis between a second pair of stop positions, without the second wind-reactive element including a counterbalancing structure extending ahead of the second leading edge and so that the second leading edge is located opposite the second trailing edge relative to the second Pivotal axis and; and wherein each of the first and second wind-reactive elements is mounted on the rotor so that each of the first and second wind-reactive elements is free to pivot between a respective one of the first and second pairs of stop positions as the rotor rotates about the rotational axis in order to align according to wind direction and impart rotational movement to the rotor;

wherein the rotor includes first stop means for the first wind-reactive element for limiting pivotal movement of the first wind-reactive element to a first stop position of the first pair of stop positions in which the first axis extends radially relative to the rotational axis;

wherein the rotor includes first stop means for the second wind-reactive element for limiting pivotal movement of the second wind-reactive element to a first stop position of the second pair of stop positions in which the second central axis extends radially relative to the rotational axis;

wherein the rotor includes second stop means for the first wind-reactive element for limiting pivotal movement of the first wind-reactive element to a second stop position of the first pair of stop positions in which the first central axis extends tangentially relative to the rotational axis; and wherein the rotor includes second stop means for the second wind-reactive element for limiting pivotal movement of the second wind-reactive element to a second stop position of the second pair of stop positions in which the second central axis extends tangentially relative to the rotational axis.

2. A rotating display apparatus as described in claim 1, wherein at least one of the wind-reactive elements is a non-airfoil.

3. A rotating display apparatus as described in claim 1, wherein at least one of the wind-reactive elements is an airfoil.

4. A rotating display apparatus as described in claim 1, wherein the first stop position of the first pair of stop positions is such that the first central axis intersects the rotational axis when the first wind-reactive element is in the first stop position of the first pair of stop positions, and the first stop position of the second pair of stop positions is such that the second central axis intersects the rotational axis when the second wind-reactive element is in the first stop position of the second pair of stop positions.

5. A rotating display apparatus as described in claim 1, wherein the second stop position of the first pair of stop positions is such that the first central axis is perpendicular to a first radial extending between the rotational axis and the first pivotal axis when the first wind-reactive element is in the second stop position of the first pair of stop positions, and the second stop position of the second pair of stop positions is such that the second central axis is perpendicular to a second radial extending between the rotational axis and the second pivotal axis when the second wind-reactive element is in the second stop position of the second pair of stop positions.

6. A rotating display apparatus as described in claim 1, further comprising more than two wind-reactive elements mounted pivotally on the rotor.

7. A rotating display apparatus as described in claim 1, wherein at least one of the first and second pairs of stop positions is adjustable.

8. A rotating display apparatus as recited in claim 1, wherein the rotor includes a lower armature in a position beneath the first and second wind-reactive elements, which lower armature has first and second lower arms extending radially from the rotational axis that function as means for providing lower support for the first and second wind-reactive elements.

9. A rotating display apparatus as described in claim 1, wherein the rotor includes an upper armature in a position above the first and second wind-reactive elements, which upper armature has at least first and second upper arms extending radially from the rotational axis that function as means for providing upper support for the first and second wind-reactive elements.

10. A rotating display apparatus as described in claim 1, wherein the first and second wind-reactive elements are mounted removably in order to facilitate replacement with other wind-reactive elements.

11. A rotating display apparatus as described in claim 1, wherein the rotor includes means for dampening movement of at least the first wind-reactive element.

12. A rotating display apparatus as described in claim 1, wherein:

the first wind-reactive element includes a main portion and a vertically disposed tube connected fixedly to the main portion, said tube including a cylindrical portion and said tube extending along the pivotal axis from the main portion to the rotor such that the main portion and the tube pivot about the first pivotal axis together; and the rotor includes a dampening spring disposed coaxially over the cylindrical portion of the tube, which dampening spring is arranged to cooperate with the main portion and the rotor in order to constrict against the cylindrical portion of the tube and thereby inhibit pivotal movement of the tube and the main portion of the first wind-reactive element when the main portion reaches a stop position.

13. A rotating display apparatus as described in claim 1, that includes a dampening mechanism adapted to adjust at least one of the first and second stop positions in operation according to rotational speed of the rotor.

14. A rotating display apparatus, comprising:

a support structure, a rotor mounted rotatably on the support structure for rotation about a vertically disposed rotational axis, and at least two wind-reactive elements on the rotor that a user may use for display purposes, which wind-reactive elements function as means for causing the rotor to rotate about the rotational axis in response to wind passing the rotating display apparatus;

wherein the two wind-reactive elements include a first wind-reactive element that has a first leading edge and a first trailing edge, a first central axis extending horizontally through the first leading edge and the first trailing edge, and a pivotal axis extending vertically intermediate the first leading edge and the first trailing edges, which first wind-reactive element is mounted on the rotor for pivotal movement about the first pivotal axis between a first pair of stop positions;

wherein the two wind-reactive elements include a second wind-reactive element that has a second leading edge and a second trailing edge, a second central axis extending horizontally through the second leading edge and the second trailing edge, and a pivotal axis extending vertically intermediate the second leading edge and the second trailing edge, which second wind-reactive element is mounted on the rotor for pivotal movement about the second pivotal axis between a second pair of stop positions;

wherein each of the first and second wind-reactive elements is mounted on the rotor so that each of the first and second wind-reactive elements is free to pivot between a respective one of the first and second pairs of stop positions as the rotor rotates about the rotational axis in order to align according to wind direction and impart rotational movement to the rotor; and wherein the rotating display apparatus includes a dampening mechanism adapted to disengage in heavy wind conditions.

15. A rotating display apparatus as described in claim 14, wherein at least one of the wind-reactive elements is a non-airfoil.

16. A rotating display apparatus as described in claim 14, wherein at least one of the wind-reactive elements is an airfoil.

17. A rotating display apparatus as described in claim 14, further comprising more than two wind-reactive elements mounted pivotally on the rotor.

18. A rotating display apparatus as described in claim 14, wherein at least one of the first and second pairs of stop positions is adjustable.

19. A rotating display apparatus as recited in claim 14, wherein the rotor includes a lower armature in a position beneath the first and second wind-reactive elements, which lower armature has first and second lower arms extending radially from the rotational axis that function as means for providing lower support for the first and second wind-reactive elements.

20. A rotating display apparatus as described in claim 14, wherein the rotor includes an upper armature in a position above the first and second wind-reactive elements, which upper armature has at least first and second upper arms extending radially from the rotational axis that function as means for providing upper support for the first and second wind-reactive elements.

21. A rotating display apparatus as described in claim 14, wherein the first and second wind-reactive elements are mounted removably in order to facilitate replacement with other wind-reactive elements.

22. A rotating display apparatus as described in claim 14, wherein the rotor includes means for dampening movement of at least the first wind-reactive element.

23. A rotating display apparatus as described in claim 14, wherein:

the first wind-reactive element includes a main portion and a vertically disposed tube connected fixedly to the main portion, said tube including a cylindrical portion and said tube extending along the pivotal axis from the main portion to the rotor such that the main portion and the tube pivot about the first pivotal axis together; and the rotor includes a dampening spring disposed coaxially over the cylindrical portion of the tube, which dampening spring is arranged to cooperate with the main portion and the rotor in order to constrict against the cylindrical portion of the tube and thereby inhibit pivotal movement of the tube and the main portion of the first wind-reactive element when the main portion reaches a stop position.

24. A rotating display apparatus as described in claim 14, that includes a dampening mechanism adapted to adjust at least one of the first and second stop positions in operation according to rotational speed of the rotor.

25. A rotating display apparatus as described in claim 14, wherein the rotor includes:

first stop means for the first wind-reactive element for limiting pivotal movement of the first wind-reactive element to a first stop position of the first pair of stop positions in which the first axis extends radially relative to the rotational axis; and first stop means for the second wind-reactive element for limiting pivotal movement of the second wind-reactive element to a first stop position of the second pair of stop positions in which the second central axis extends radially relative to the rotational axis.

26. A rotating display apparatus as described in claim 25, wherein the first stop position of the first pair of stop positions is such that the first central axis intersects the rotational axis when the first wind-reactive element is in the first stop position of the first pair of stop positions, and the first stop position of the second pair of stop positions is such that the second central axis intersects the rotational axis when the second wind-reactive element is in the first stop position of the second pair of stop positions.

27. A rotating display apparatus as described in claim 14, wherein the rotor includes:

second stop means for the first wind-reactive element for limiting pivotal movement of the first wind-reactive element to a second stop position of the first pair of stop positions in which the first central axis extends tangentially relative to the rotational axis; and second stop means for the second wind-reactive element for limiting pivotal movement of the second wind-reactive element to a second stop position of the second pair of stop positions in which the second central axis extends tangentially relative to the rotational axis.

28. A rotating display apparatus as described in claim 27, wherein the second stop position of the first pair of stop positions is such that the first central axis is perpendicular to a first radial extending between the rotational axis and the first pivotal axis when the first wind-reactive element is in the second stop position of the first pair of stop positions, and the second stop position of the second pair of stop positions is such that the second central axis is perpendicular to a second radial extending between the rotational axis and the second pivotal axis when the second wind-reactive element is in the second stop position of the second pair of stop positions.

* * * * *